UNITED STATES PATENT OFFICE.

MAURICE J. COURET, OF NEW ORLEANS, LOUISIANA, ASSIGNOR, BY DIRECT AND MESNE ASSIGNMENTS, TO LOUISIANA BIOLOGICAL PRODUCTS, INCORPORATED, OF NEW ORLEANS, LOUISIANA, A CORPORATION OF LOUISIANA.

PROCESS OF MANUFACTURING A VACCIN FOR THE PREVENTION OF HOG-CHOLERA AND PRODUCT THEREFROM.

1,246,059. Specification of Letters Patent. Patented Nov. 13, 1917.

No Drawing. Application filed February 16, 1917. Serial No. 149,054.

*To all whom it may concern:*

Be it known that I, Maurice J. Couret, a citizen of the United States, residing at New Orleans, in the parish of Orleans and State of Louisiana, have invented certain new and useful Improvements in Processes of Manufacturing a Vaccin for the Prevention of Hog-Cholera, and Products Therefrom; and I do hereby declare the following to be a full, clear, and exact description of the invention, such as will enable others skilled in the art to which it appertains to make and use the same.

My invention relates to the manufacture of vaccin for the prevention of hog cholera and consists in a process whereby a vaccin is secured which, when properly applied, is safe and reliable to protect the hog for a period of four months, and probably indefinitely, against hog cholera.

My invention also includes the product of said process as will be hereinafter more fully described.

In order to prepare the vaccin, I take a hog in the advanced state of hog cholera and, therefore, heavily infected with cholera; and, while the hog is still alive, I inject into its peritoneal cavity a nutrient broth, possessed of exosmotic properties, which causes exosmosis of the animal fluids containing hog cholera virus and its products. To insure the quantity of fluid injected being increased rather than diminished, it is essential that the broth possess exosmotic properties, otherwise endosmosis would take place and the amount of fluid injected would be decreased rather than increased.

To provide a nutrient broth possessed of exosmotic properties I use a broth or other meat-laden infusion composed of approximately one pound by weight of lean flesh to 1,000 c. c. of distilled water, containing five-tenths of one per cent. sodium chlorid and one per cent. dextrose and having a reaction of approximately eight-tenths of one per cent. acid to phenophthalein. This broth is injected into the animal in the proportion of approximately 30 c. c. of fluid per pound weight of the hog so treated.

This material so injected is allowed to remain in the hog for a period of from 5 to 6 hours. This infusion draws from the tissues of the hog the tissue juices so that, when the peritoneal cavity is drained, a larger amount of fluid is recovered than was originally injected, and thus the amount of essential material for the production of vaccin is increased. This fluid so removed and drawn from the hog is ladened with the living virus of hog cholera and its toxins and other specific and non-specific products, the latter probably the result of leucocytic action. However, this fluid is only withdrawn from the peritoneal cavity after the hog has been killed by exsanguination and all of its blood drawn off as hereinafter set out.

The hog is killed by exsanguination, *i. e.* by bleeding to death. The blood from the hog is drawn off into a sterile container and defibrinated by constant stirring with beads or other equivalent method during the process of bleeding. The blood also contains the living virus of hog cholera and its toxins and other products, as above mentioned.

The defibrinated blood from the hog and the infusion withdrawn from the peritoneal cavity are mixed and kept in a sterile container. The heart, liver, spleen, kidneys and other soft tissues from the said dead hog are collected under strict aseptic conditions, removing, as far as possible, the ligaments, capsules, vessels, etc. These tissues are then passed through an ordinary meat grinder under aseptic conditions and the resulting mass is mixed with the mixture of blood and fluid drawn from the hog and its peritoneal cavity, respectively, as hereinabove described, and the then resulting mass is further macerated with granular quartz, or coarse sand, so as to insure the grinding of the tissues into small particles and the further liberation of the contained juices.

The entire mixture or resulting mass is then filtered through fine linen under pressure and the filtrate is gathered in a sterile container.

I thus secure a very greatly increased supply of infective material in liquid state, obtaining from a hog of about 50 pounds 2000 to 2300 cubic centimeters of liquid vaccin producing material.

To safely employ such material for administration to protect a hog, it is necessary to destroy the viability of the organisms without impairment of the toxins and immunity producing substances. For such destruction of the infective organisms, I have found that the use of heat is not certain, and for such destruction I find that the volatile liquids of the class of alcohols or ethers possess certain advantages; of all such liquids, however, I find that chloroform affords a much more certain destruction of the organisms with the least effect of impairment of the toxins and immunizing substances.

When employing the preferred agent, chloroform, I add to the filtrate obtained, as hereinbefore stated, an amount of chloroform necessary to fully saturate it; the chloroform being heavier than the filtrate, it is necessary to shake or agitate the mixture.

The mixture is then allowed to stand for a period of about 10 to 15 minutes, during which time the excess of chloroform settles at the bottom of the container. The filtrate is then carefully decanted, that is to say, all of the material other than the chloroform, which has settled at the bottom, is removed. In the fluid which has been decanted there is necessarily contained a certain amount of chloroform which did not settle at the bottom in the process of standing.

This fluid should be at once placed in amber-colored bottles or otherwise protected from light and should not be for any considerable time subjected to temperature higher than ordinary room temperature (20 to 25° C.).

This fluid or filtrate is the vaccin product. It contains the killed virus of hog cholera (the viability of the organisms having been destroyed in the process), and also the toxins and other specific and non-specific products or active immunizing substances whose properties have not been destroyed or appreciably affected through or as a result of the process.

The vaccin may contain a small amount of chloroform which, however, is not injurious and does not affect or impair its immunizing qualities or properties, but, on the contrary, acts as a preservative preventing bacterial growth.

In order to permanently preserve the potency of the vaccin, I prefer to reduce the product to a desiccated state. This desiccation is accomplished in the following manner.

Prior to desiccation, the chloroform remaining in the decanted filtrate is driven off by allowing the filtrate to stand in a dry chamber at a temperature of 40 to 45° C. until it no longer smells of chloroform.

After the chloroform has been evaporated, the fluid is desiccated *in vacuo* over some neutral hygroscopic agent such as sulfuric acid, caustic soda, or unslaked lime at refrigerator temperature (8° to 12° C.) until desiccation is complete. The resulting desiccated material is pulverized and it is then the finished product in the desiccated or finished state. It is then placed in sealed containers in a dark place, or in dark containers; in either case, at refrigerator temperature, where its efficiency and potency will be maintained for an indefinite period.

For practical administration of the vaccin, the powder is dissolved in distilled water, or normal salt solution, in the proportion of 100 milligrams of desiccated powder or vaccin to one cubic centimeter of fluid, and this solution is then injected hypodermatically into the hog which is to be protected; the dosage of the solution being two cubic centimeters for a hog weighing 50 lbs., adding one cubic centimeter for each additional 50 lbs. up to 400 lbs., not to exceed 10 cubic centimeters for a hog of any weight, though the dose may be increased appreciably without injury to the animal.

I find that, when the vaccin is administered to a hog not infected with hog cholera, it will act as a preventive by establishing in the animal in due course, and within a period of ten days, an active immunity against hog cholera, which immunity will endure for a period of not less than four months and probably indefinitely.

I have found by actual experiments that, if the vaccin be administered in the same manner to a hog infected with hog cholera, or in the early stages of the disease, the vaccin appears to act as a curative agent, aborting the disease, or retarding its progress, or lessening its severity, and thereby assisting the animal in its recovery.

Under these circumstances, and for this latter purpose, the dose may be increased by from 50 per cent. to 100 per cent. over that indicated as a preventive.

The injection into the peritoneal cavity of the live hog of the solution hereinbefore referred to materially increases the yield of the vaccin material; but this injection may be omitted, and use made of the blood and other soft tissues only of the hog, or of the blood alone, with or without its cellular elements, in securing the final vaccin product.

Under certain circumstances it may be also desirable to use the liquid product before the final step of desiccating the same; but it can be kept more conveniently, and transported more readily, in the desiccated form.

When used in the liquid form before desiccation it is injected into the hog hypodermatically in similar proportions to those already stated for the desiccated product, that is 2 cubic centimeters for a hog weighing 50 lbs. or less, and one additional cubic centimeter for each additional 50 pounds in weight of the hog, not to exceed ten cubic centimeters; but the dose may be materially increased without injury to the animal.

It is probable that the potency of the vaccin product is increased by mixing the strain of virus and its toxins and other products. This mixing is accomplished by using in the preparation of the product several animals affected with hog cholera virus obtained from different sections of the country.

Having thus described my invention, what I claim and desire to secure by Letters Patent of the United States is:

1. The process for the production of a vaccin product for the prevention of hog cholera which consists in removing from the infected hog parts containing the virulent virus, removing the solid particles from said parts, and treating the liquid residue with a volatile liquid capable of destroying the infecting organisms without material impairment of their toxin constituents, and subsequently separating out the volatile liquid.

2. The process for the production of a vaccin product for the prevention of hog cholera which consists in removing from the infected hog parts containing the virulent virus, removing the solid particles from said parts, and treating the liquid residue with a volatile liquid capable of destroying the infecting organisms without material impairment of their toxin constituents, subsequently separating out the volatile liquid, and finally desiccating the residue.

3. The process of preparing a vaccin for hog cholera which consists in treating the active fluid secured from a hog infected with hog cholera with a volatile liquid capable of destroying the infecting organisms contained in said fluid but without materially impairing their toxic constituents, and subsequently permitting the evaporation of said volatile liquid.

4. The process for the production of a vaccin product for the prevention of hog cholera which consists in removing from the infected hog parts containing the virulent virus, removing the solid particles from said parts, treating the liquid residue with chloroform, and separating out the chloroform.

5. The process for the production of a vaccin product for the prevention of hog cholera which consists in removing from the infected hog parts containing the virulent virus, removing the solid particles from said parts, treating the liquid residue with chloroform, and separating out the chloroform, and finally desiccating the residue.

6. The process for the production of a vaccin product for the prevention of hog cholera which consists in removing from the infected hog parts containing the virulent virus, removing the solid particles from said parts, treating the liquid residue with chloroform, and separating out the chloroform by subjecting the solution to a temperature of not over 45° C.

7. The process for the production of a vaccin product for the prevention of hog cholera which consists in removing from the infected hog parts containing the virulent virus, removing the solid particles from said parts, treating the liquid residue with chloroform, separating out the chloroform by subjecting the solution to a temperature of not over 45° C., and finally desiccating the residue of approximately 10° C.

8. The method of increasing the yield of material, containing the virus of hog cholera and its products, from hogs infected with hog cholera, which consists in injecting into the animal a germ culture medium in liquid form, containing dextrose, having exosmotic properties whereby the fluid and tissue juices of the animal are drawn into the peritoneal cavity mixing with the introduced germ culture medium.

9. The method of increasing the yield of material, containing the virus of hog cholera and its products, from hogs infected with hog cholera, which consists in injecting into the animal a germ culture medium in liquid form, containing dextrose and having an acid reaction, possessing exosmotic properties whereby the fluid and tissue juices of the animal are drawn into the peritoneal cavity mixing with the introduced germ culture medium.

10. The process for the production of a vaccin product for the prevention of hog cholera which consists in injecting into the animal a germ culture medium in liquid form, containing dextrose and possessing exosmotic properties, whereby a transudation of such fluids with the contained organisms and other constituents is caused to admix with the injected fluid, removing the blood, culture medium and soft tissues from the animal, mixing and macerating same, straining out the solid particles from the mass, treating the liquid residue with a volatile liquid capable of destroying the infecting organisms without material impairment of their toxic constituents, and subsequently separating out the volatile liquid.

11. The process for the production of a vaccin product for the prevention of hog cholera which consists in injecting into the animal a germ culture medium in liquid form, containing dextrose and possessing exosmotic properties, whereby a transudation of such fluids with the contained organisms and other constituents is caused to admix with the injected fluid, removing the blood, culture medium and soft tissues from the animal, mixing and macerating same, straining out the solid particles from the mass, treating the liquid residue with a volatile liquid capable of destroying the infecting organisms without material impairment of their toxic constituents, and subsequently separating out the volatile liquid, and finally desiccating the residue.

12. The process for the production of a vaccin product for the prevention of hog cholera which consists in injecting into the animal a germ culture medium in liquid form, containing dextrose and possessing exosmotic properties, whereby a transudation of such fluids with the contained organisms and other constituents is caused to admix with the injected fluid, removing the blood, culture medium and soft tissues from the animal, mixing and macerating same, straining out the solid particles from the mass, and treating the liquid residue with chloroform, and separating out the chloroform.

13. The process for the production of a vaccin product for the prevention of hog cholera which consists in injecting into the animal a germ culture medium in liquid form, containing dextrose and possessing exosmotic properties, whereby a transudation of such fluids with the contained organisms and other constituents is caused to admix with the injected fluid, removing the blood, culture medium and soft tissues from the animal, mixing and macerating same, straining out the solid particles from the mass, and treating the liquid residue with chloroform, and separating out the chloroform, and finally desiccating the residue.

14. The process for the production of a vaccin product for the prevention of hog cholera which consists in injecting into the animal a liquid medium containing dextrose and having an acid reaction, and possessing exosmotic properties, whereby a transudation of such fluids with the contained organisms and other constituents is caused to admix with the injected fluid, removing the blood, liquid medium and soft tissues from the animal, mixing and macerating same, straining out the solid particles from the mass, treating the liquid residue with a volatile liquid capable of destroying the infecting organisms without material impairment of their toxic constituents, and subsequently separating out the volatile liquid.

15. The process for the production of a vaccin product for the prevention of hog cholera which consists in injecting into the animal a liquid medium containing dextrose and having an acid reaction, and possessing exosmotic properties, whereby a transudation of such fluids with the contained organisms and other constituents is caused to admix with the injected fluid, removing the blood, liquid medium and soft tissues from the animal, mixing and macerating same, straining out the solid particles from the mass, treating the liquid residue with a volatile liquid capable of destroying the infecting organisms without material impairment of their toxic constituents, and subsequently separating out the volatile liquid, and finally desiccating the residue.

16. The process for the production of a vaccin product for the prevention of hog cholera which consists in injecting into the animal a liquid medium containing dextrose and having an acid reaction, and possessing exosmotic properties, whereby a transudation of such fluids with the contained organisms and other constituents is caused to admix with the injected fluid, removing the blood, liquid medium and soft tissues from the animal, mixing and macerating same, straining out the solid particles from the mass, and treating the liquid residue with chloroform, and separating out the chloroform.

17. The process for the production of a vaccin product for the prevention of hog cholera which consists in injecting into the animal a liquid medium containing dextrose and having an acid reaction, and possessing exosmotic properties, whereby a transudation of such fluids with the contained organisms and other constituents is caused to admix with the injected fluid, removing the blood, liquid medium and soft tissues from the animal, mixing and macerating same, straining out the solid particles from the mass, and treating the liquid residue with chloroform, and separating out the chloroform, and finally desiccating the residue.

18. A product for the prevention or treatment of hog cholera comprising a vaccin material made from the liquid residue from any one or more of the blood or other soft tissues of a hog infected with hog cholera, treated with a volatile liquid capable of destroying the infecting organisms without material impairment of their toxin constituents, and from which the volatile liquid has been separated after such treatment.

19. A product for the prevention or treatment of hog cholera comprising a vaccin material made from the liquid residue from any one or more of the blood or other soft tissues of a hog infected with hog cholera, treated with a volatile liquid capable of destroying the infecting organisms without material impairment of their toxin constituents, and afterward desiccated.

20. A product for the prevention or treatment of hog cholera comprising a vaccin material in the form of a dry powder made from the liquid residue from any one or more of the blood or other soft tissues of a hog infected with hog cholera, treated with a volatile liquid capable of destroying the infecting organisms without material impairment of their toxic constituents, and subsequently desiccated and reduced to powdered form.

21. A product for the prevention or treatment of hog cholera comprising a vaccin material made from the liquid residue from any one or more of the blood or other soft tissues of a hog infected with hog cholera, treated with chloroform.

22. A product for the prevention or treatment of hog cholera comprising a vaccin material made from the liquid residue from any one or more of the blood or other soft tissues of a hog infected with hog cholera, treated with chloroform, and afterward desiccated.

23. A product for the prevention or treatment of hog cholera comprising a vaccin material in the form of a dry powder made from the liquid residue from any one or more of the blood or other soft tissues of a hog infected with hog cholera, treated with chloroform, desiccated and reduced to powdered form.

In testimony whereof, I affix my signature.

MAURICE J. COURET.